March 14, 1961     H. B. OSBORN, JR     2,975,259
METHOD FOR BONDING LINERS TO TUBES
Filed Jan. 7, 1959
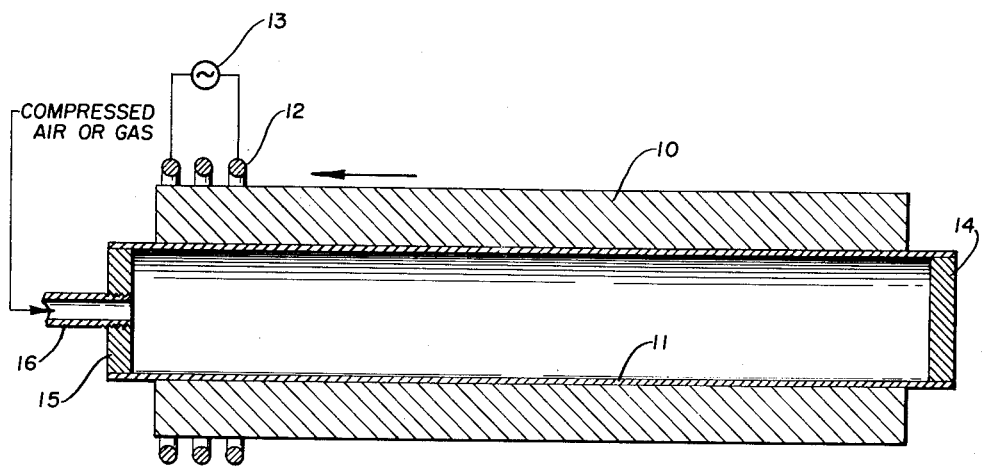
INVENTOR.
HARRY B. OSBORN JR.
BY
ATTORNEY United States Patent Office 2,975,259
Patented Mar. 14, 1961

2,975,259

METHOD FOR BINDING LINERS TO TUBES

Harry B. Osborn, Jr., Cleveland, Ohio, assignor to The Ohio Crankshaft Company, Cleveland, Ohio, a corporation of Ohio Filed Jan. 7, 1959, Ser. No. 785,447

3 Claims. (Cl. 219—9.5)

This invention relates generally to a method of bonding liner to the inside of a tube, and particularly to such a method for bonding a non-ferrous liner to the inside of a steel tube.

In the past, when attempting to bond a liner of non-ferrous material, such as copper, to the inside of a long steel tube by heating the steel tube to the bonding temperature by means of induction heating, difficulty was encountered due to the tendency of the steel tube to expand away from the liner so that a gap was formed between the inside of the tube and the liner before the bonding action between them took place.

The present invention is directed to a novel method for bonding a non-ferrous liner to the inside of the steel tube which avoids this difficulty.

In accordance with the present invention, the interior of such a liner positioned within the tube is maintained under pressure which tends to expand the liner radially outward against the inside of the tube. Preferably such pressure is maintained throughout the induction heating during which the liner is bonded to the tube. Because of such internal pressure in the liner, the liner is maintained tightly against the inside of the tube, even though the tube tends to expand outwardly as it becomes heated.

It is an object of this invention to provide a novel and an improved method of bonding a liner to the inside of the tube.

It is also an object of this invention to provide a novel method of bonding a non-ferrous liner to the inside of a long steel tube.

Another object of this invention is to provide a novel method of bonding a non-ferrous liner to the inside of a steel tube which does not require that the liner and the tube be accurately machined so as to interfit precisely.

A further object of this invention is to provide improvements in the bonding of a non-ferrous liner to the inside of an elongated steel tube which involves heating the tube inductively progressively on its length.

Further objects and advantages of this invention will be apparent from the following detailed description of a presently-preferred embodiment thereof, which is illustrated schematically in the accompanying drawing.

The single figure of the drawing shows a lengthwise section through a steel tube having a non-ferrous liner on the inside, together with a schematically illustrated induction heating apparatus for bonding the liner to the inside of the tube.

Referring to the drawing, the steel tube 10 is elongated and cylindrical and has appreciable radial thickness so that it is substantially rigid. The non-ferrous liner 11, which is to be bonded to the inside of the steel tube 10, is sufficiently thin that it will expand radially outward under the pressure of compressed air or gas in its interior. In the embodiment under discussion, the material of the liner 11 is copper. It is to be understood, of course, that it might be of any other suitable material if desired.

The liner 11 has an easy sliding fit inside the tube 10 so that it may be readily inserted therein. Obviously the interfaces between the liner 11 and the tube 10 should be properly fluxed before inserting the liner into the tube.

The induction heater which is used to bond the liner 11 to the inside of the tube 10 may be of any suitable construction. In the drawing it is shown schematically as comprising a multi-turn induction heating coil 12 suitably coupled to a power source 13 which may operate at any desired frequency within the range from about 60 cycles per second to 10,000 cycles per second. This inductor 12 is shorter than the length of the tube 10 and is progressed along the length of the tube at a rate such that taking into consideration, the power input to the inductor 12 and thickness of the tube 10, the tube 10 and liner 11 will be heated to the bonding temperatures. Thus the bonding of the inner liner to the tube takes place progressively along the length of the tube by moving the tube and liner as a unit lengthwise axially through the heating coil 12 while power is applied to the heating coil.

In accordance with the present invention, the non-ferrous inner liner 11 is tightly plugged at one of its ends by means of a suitable closure 14. At its opposite end the liner is provided with another closure 15 which has a fitting 16 connected to a suitable pressure source, the pressure fluid preferably being compressed air or an inert gas.

With this arrangement, in accordance with the present invention, the pressure fluid is introduced into the interior of the liner 11 and causes the liner to expand radially outward to fit tightly against the inside of the steel tube 10. As the induction heating takes place progressively along the length of the tube, the internal pressure inside the liner is maintained at a value sufficient to hold the liner tightly against the tube 10 as the latter expands while being heated.

With this arrangement, the effectiveness of the bonding of the inner liner 11 to the inside of the tube 10 is greatly enhanced because of the tight pressure engagement which is maintained between them throughout the bonding operation. At the same time the necessity of machining the tube 10 and the liner 11 to close tolerances so as to maintain such tight engagement is completely obviated because the internal pressure within the liner will maintain them tightly engaged despite variations in their dimensions which, in the absence of such pressure, would make effective bonding between them impossible.

While there has been described in detail herein and illustrated schematically in the accompanying drawing a particular preferred embodiment of this invention, it is to be understood that various modifications, omissions and refinements which depart from the disclosed embodiment may be adopted without parting from the spirit and scope of this invention.

Having thus described my invention, I claim:

1. A method of bonding a non-ferrous liner to the inside of a steel tube which comprises the steps of inserting into a rigid steel tube a thin radially expandable liner which has a sliding fit therein, closing the ends of said liner in substantially fluid-tight fashion, and, with the liner slidably disposed in the tube and disconnected therefrom, introducing compressed fluid into the interior of the liner to expand the liner radially outward tightly against the inside of the tube, and moving the tube and liner lengthwise through an induction heater while maintaining fluid pressure inside the liner to hold the liner tightly against the inside of the tube as the tube and liner are heated progressively by the induction heater.

2. A method of bonding an inner liner to the inside of a tube which comprises the steps of inserting into a tube a radially expandable liner which has a sliding fit in the tube, and, with the liner is slidably disposed in the tube and unattached to the tube, establishing above-atmospheric pressure inside the liner to expand the liner radially outward tightly against the inside of the tube and heating the tube and the liner to bond the liner to the inside of the tube.

3. The method of claim 2 wherein the tube and liner are heated progressively along their length.

References Cited in the file of this patent

UNITED STATES PATENTS

| | | |
|---|---|---|
| 1,998,496 | Fiedler | Apr. 23, 1935 |
| 2,713,196 | Brown | July 19, 1955 |
| 2,820,286 | Andrus | Jan. 21, 1958 |